United States Patent
Das et al.

(10) Patent No.: US 9,859,806 B2
(45) Date of Patent: Jan. 2, 2018

(54) METHOD AND APPARATUS FOR OBTAINING ELECTRICITY FROM OFFSHORE WIND TURBINES

(71) Applicant: ABB Technology AG, Zurich (CH)

(72) Inventors: Debrup Das, Raleigh, NC (US); Jiaqi Liang, Cary, NC (US); Darren Tremelling, Apex, NC (US); Jiuping Pan, Raleigh, NC (US)

(73) Assignee: ABB RESEARCH LTD., Zurich (CH)

( * ) Notice: Subject to any disclaimer, the term of this patent is extended or adjusted under 35 U.S.C. 154(b) by 540 days.

(21) Appl. No.: 14/490,311

(22) Filed: Sep. 18, 2014

(65) Prior Publication Data

US 2015/0260163 A1   Sep. 17, 2015

Related U.S. Application Data

(63) Continuation-in-part of application No. 14/253,590, filed on Apr. 15, 2014.

(60) Provisional application No. 61/953,111, filed on Mar. 14, 2014.

(51) Int. Cl.
| | |
|---|---|
| *H02M 5/22* | (2006.01) |
| *H02J 3/38* | (2006.01) |
| *H02J 3/34* | (2006.01) |
| *F03D 9/25* | (2016.01) |

(52) U.S. Cl.
CPC .............. *H02M 5/22* (2013.01); *F03D 9/257* (2017.02); *H02J 3/34* (2013.01); *H02J 3/38* (2013.01); *H02J 3/386* (2013.01); *Y02E 10/763* (2013.01); *Y10T 307/664* (2015.04)

(58) Field of Classification Search
CPC ...................................................... H02M 5/22

USPC ........................................................... 307/73
See application file for complete search history.

(56) References Cited

U.S. PATENT DOCUMENTS

| | | | |
|---|---|---|---|
| 4,703,189 A | 10/1987 | DiValentin | |
| 8,388,481 B2 | 3/2013 | Han | |
| 8,476,854 B2* | 7/2013 | Blocher | ............... H02M 7/483 |
| | | | 318/400.01 |

(Continued)

FOREIGN PATENT DOCUMENTS

| | | |
|---|---|---|
| CN | 1967961 | 5/2007 |
| CN | 101950981 | 1/2011 |

(Continued)

OTHER PUBLICATIONS

Chen, Hao, "Advances in wind power generation, transmission, and simulation technology", Iowa State University, Graduate Theses and Dissertations, Paper 12957, 2012, pp. 1-133.

(Continued)

*Primary Examiner* — Joseph Chang
(74) *Attorney, Agent, or Firm* — Taft Stettinius & Hollister LLP

(57) ABSTRACT

According to one aspect of the teachings herein, a system for obtaining electricity from wind turbines provides advantageous operation with respect to offshore wind turbines where the size and weight of electricity generation and collection equipment are key considerations. The contemplated system includes an apparatus that is configured for collecting wind-generated electricity at a fixed low frequency and at a desired collection voltage, based on the advantageous configuration and use of a modular multilevel converter or MMC.

24 Claims, 8 Drawing Sheets

(56) References Cited

U.S. PATENT DOCUMENTS

| | | | |
|---|---|---|---|
| 8,558,405 B2 | 10/2013 | Brogan | |
| 8,587,141 B2 | 11/2013 | Bjerknes | |
| 8,994,206 B2 | 3/2015 | Bala | |
| 9,133,825 B2 | 9/2015 | Andresen | |
| 2003/0227172 A1 | 12/2003 | Erdman et al. | |
| 2009/0273956 A1* | 11/2009 | Castelli Dezza | H02M 7/25 363/67 |
| 2011/0049994 A1 | 3/2011 | Hiller | |
| 2012/0069610 A1 | 3/2012 | Trainer et al. | |
| 2013/0003299 A1* | 1/2013 | Wissner | H02M 7/003 361/695 |
| 2014/0063871 A1* | 3/2014 | Bousfield, III | H02J 5/00 363/37 |
| 2015/0260162 A1 | 9/2015 | Pan et al. | |

FOREIGN PATENT DOCUMENTS

| | | |
|---|---|---|
| CN | 103311951 A | 9/2013 |
| EP | 1276224 A1 | 1/2003 |
| EP | 2161443 A2 | 3/2010 |
| WO | 2012048743 A1 | 4/2012 |

OTHER PUBLICATIONS

Chen, Hao et al., "Low-Frequency AC transmission for Offshore Wind Power", IEEE Transactions on Power Delivery, vol. 28, Issue 4, Oct. 2013, pp. 2236-2244.

Cho, Yongnam et al., "Advanced Time Domain Method for Remote Wind Farms with LFAC Transmission Systems: Power Transfer and Harmonics", North American Power Symposium (NAPS), Champaign, Illinois, US, Sep. 9-11, 2012. pp. 1-6.

Cho, Yongnam et al., "LFAC—Transmission Systems for Remote Wind Farms Using a Three-phase, Six-pulse Cycloconverter", IEEE. 2012. pp. 1-7.

De Vries, Eize, "The Vestas V164 and drivetrain choice", WindPower Monthly, Webcast: Drive operational efficiency come rain or shine, available at http://www.windpowermonthly.com/article/1169347/vestas-v164-drivetrain-choice, obtained on May 14, 2013, Feb. 8, 2013, pp. 1-5.

Erickson, R., "A New Family of Multilevel Matrix Converters for Wind Power Applications: Final Report", National Renewable Energy Laboratory, Contract No. DE-AC36-99-GO10337, Subcontract Report NREL/SR-500-40051, Golden, Colorado, Jul. 2002-Mar. 2006, pp. 1-468.

Fischer, W. et al., "Low Frequency High Voltage Offshore Grid for Transmission of Renewable Power", 3rd IEEE PES International Conference and Exhibition on Innovative Smart Grid Technologies (ISGT Europe); Berlin, Germany, Oct. 14-17, 2012. pp. 1-6.

Mau, C. N. et al., "Grid Connection of Offshore Wind Farm based DFIG with Low Frequency AC Transmission System", IEEE. 2012. pp. 1-7.

Miura, Yushi et al., "Modular Multilevel Matrix Converter for Low Frequency AC Transmission", 2013 IEEE, 2013, pp. 1079-1084.

Ning, L., et al., "Experiment on Wind Power Integration Grid via Fractional Frequency Transmission System-Realization of the Variable-speed Variable-frequency Power Wind," 2011 4th International Conference on Electric Utility Deregulation and Restructuring, pp. 1-6.

Qin, N., et al., "Offshore Wind Farm Connection with Low Frequency AC Transmission Technology," Power & Energy Society General Meeting, 2009. PES General Meeting. IEEE. Calgary, Alberta, Canada, Jul. 26-30, 2009. pp. 1-8.

Song, Z., et al., "Optimal Control Study for Fractional Frequency Wind Power System," 2012 Asia-Pacific Power and Energy Engineering Conference (APPEEC). Shanghai, China, Mar. 27-29, 2012. pp. 1-5.

Tenca, Pierluigi et al., "Wind Turbine Current-Source Converter Providing Reactive Power Control and Reduced Harmonics", IEEE Transactions on Industry Applications, vol. 43, No. 4, Jul./Aug. 2007, pp. 1050-1060.

Unknown, Author, "FusionDrive 3-10", Moventas, available online at http://www.moventas.com/products/fusion-drive/, obtained on May 14, 2014, pp. 1-4.

Unknown, Author, "Fusiondrive, the most advanced wind turbine drivetrain, successful in testing", Moventas, Apr. 4, 2013 Press Release, available at http://www.moventas.com/news/press-releases, obtained on May 14, 2014, Apr. 4, 2013, pp. 1-2.

Unknown, Author, "Investigation of Low Frequency Offshore AC Networks", Author Unknown, "Investigation of Low Frequency Offshore AC Networks," Thesis Proposal Master Energy. 2013-2014. pp. 1-1.

Van Wyk, Liezl, "Diavik Diamond Mine Wind Farm Project", http://www.bullfrogpower.com/remotemicrogrids/presentations/session_6_diavik_diamond_mine.pdf, Jun. 26, 2013, pp. 1-15.

Venkat, Jakka et al., "Power Electronic Transformers in Smart Grids", IEEMA TRAFOTECH 2014, 9th International Conference on Transformers, Indian Institute of Technology Bombay, Mumbai-400076, 2014, pp. 1-8.

Wang, Xifan, "Integrating Wind Power Plant via Fractional Frequency Transmission System", Presentation at UK-China Strategic Workshop on Smart Grids, Oxford, United Kingdom, 2010, pp. 1-31.

Wang, Xiongfei et al., "A Review of Power Electronics Based Microgrids", Journal of Power Electronics, vol. 12, No. 1, JPE Jan. 23, 2012, Jan. 2012, pp. 181-192.

Yang, Quan-Xin et al., "Research on Wind Power Connected to Power Grid by Fractional Frequency Transmission System", Power and Energy Engineering Conference (APPEEC), 2010 Asia-Pacific. Chengu, China, Mar. 28-31, 2010, pp. 1-4.

Yazdani, Amirnaser et al., "A Neutral-Point Clamped Converter System for Direct-Drive Variable-Speed Wind Power Unit", IEEE Transactions on Energy Conversion, vol. 21, No. 2, Jun. 2006, pp. 596-607.

Author Unknown, "FusionDrive from 3 MW to offshore class, The smartest gear and generator combo in the market" Moventas www.theswitch.com, Aug. 2012, pp. 1-6.

\* cited by examiner

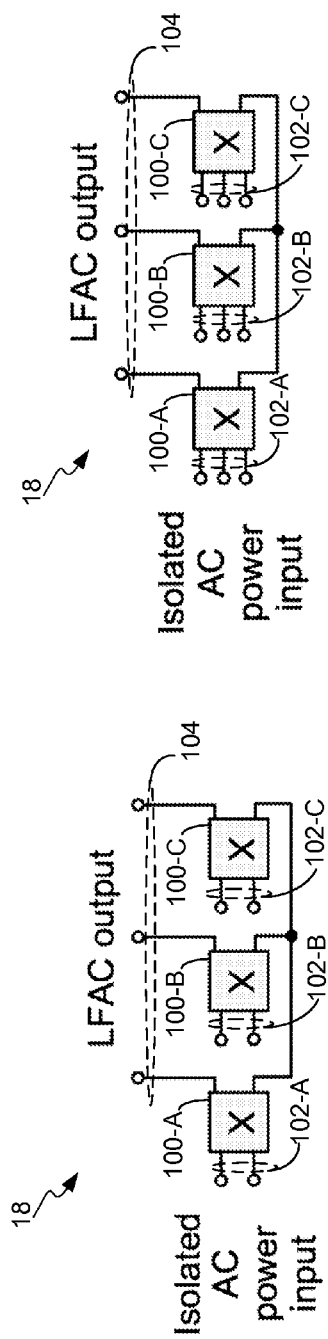
FIG. 9
FIG. 8
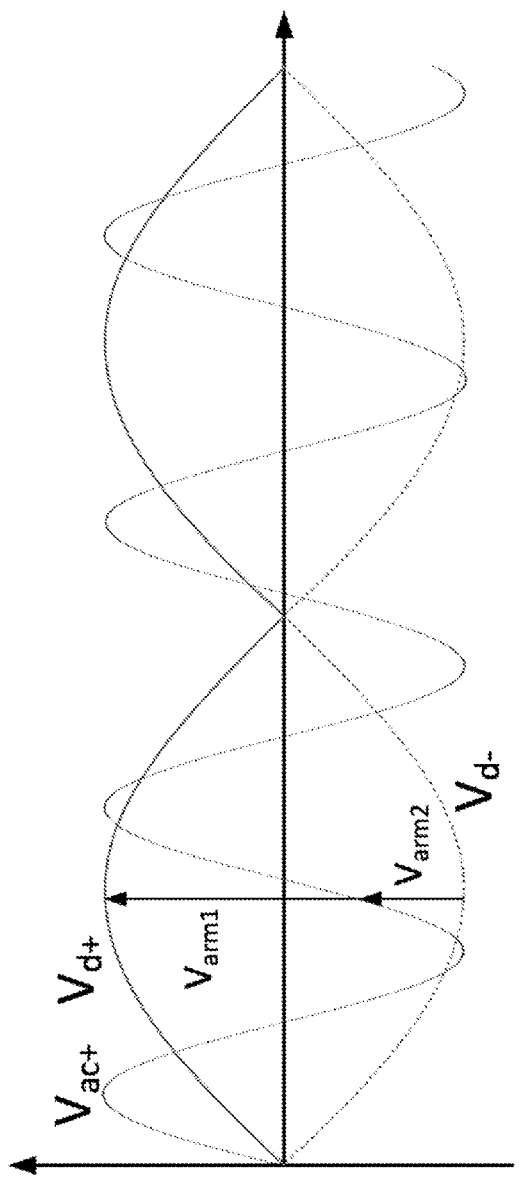
FIG. 10

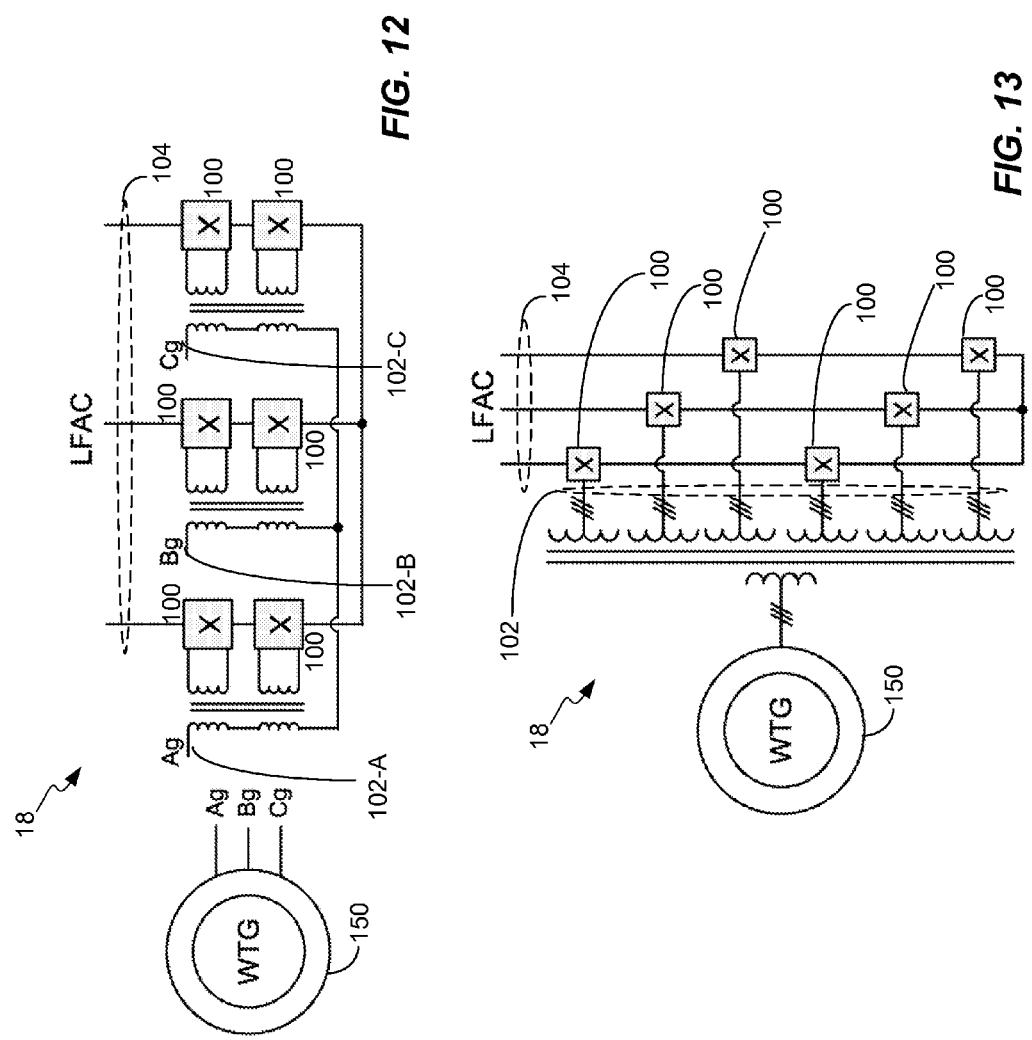

METHOD AND APPARATUS FOR OBTAINING ELECTRICITY FROM OFFSHORE WIND TURBINES

RELATED APPLICATIONS

This application claims priority under 35 U.S.C. §119 from U.S. Provisional Patent Application No. 61/953,111 filed on 14 Mar. 2014, the content of said application incorporated herein by reference in its entirety, and further claims priority under 35 U.S.C. §120 as a continuation in part of application Ser. No. 14/253,590 filed on 15 Apr. 2014.

TECHNICAL FIELD

The present invention generally relates to offshore wind turbines and particularly relates to obtaining electricity from offshore wind turbines.

BACKGROUND

Typical large-scale offshore wind farm architectures include a plurality of wind turbines, along with generators and collection networks, for collecting the generated electricity and transmitting it to shore, e.g., via high-voltage DC, HVDC, or high-voltage AC, HVAC, transmission systems. The choice of HVAC or HVDC transmission depends mainly on the distance from the offshore wind farm to the onshore grid connection point.

The use of low-frequency AC, LFAC, transmission at high voltages to the onshore grid connection point has also been considered. While LFAC transmission from the offshore wind farm requires additional frequency conversion equipment at the onshore grid connection point, its usage can extend the economic distance of HVAC connections between the offshore wind farm and the onshore grid connection point.

In a known approach to low-frequency collection and transmission of electricity in offshore wind farms, low-speed generators produce AC outputs with a nominal frequency of 16.7 Hz or 20 Hz. The generated electricity is coupled into the LFAC transmission system using one or more boost transformers. However, it is recognized herein that this approach suffers from a number of disadvantages, including necessitating the use of undesirably large equipment.

SUMMARY

According to one aspect of the teachings herein, a system for obtaining electricity from wind turbines provides advantageous operation with respect to offshore wind turbines where the size and weight of electricity generation and collection equipment are key considerations. The contemplated system includes an apparatus that is configured for collecting wind-generated electricity at a fixed low frequency and at a desired collection voltage, based on the advantageous configuration and use of a modular multilevel converter or MMC.

In a more detailed example, the contemplated system is configured for obtaining electricity in an offshore wind turbine farm and includes a first arrangement that includes a gearbox configured to mechanically change a variable first rotational speed of a wind turbine into a higher variable second rotational speed. The arrangement correspondingly includes a generator having a rated electrical frequency for full-power output in a range from about 50 Hz to about 150 Hz. The generator is configured to be driven at the variable second rotational speed by an output of the gearbox and to thereby generate electricity at a correspondingly variable first frequency. In turn, the arrangement includes an AC-to-AC converter which comprises an MMC and which is configured to convert the electricity from the generator into electricity output from the AC-to-AC converter at a fixed low frequency for offshore collection at the fixed low frequency that is lower than a utility grid frequency.

The MMC has converter inputs and corresponding converter outputs, and further includes associated modular conversion circuitry. Collectively, such circuitry is configured to receive input electricity over a variable frequency range expected for the variable first frequency of the electricity output from the generator and to convert the input electricity into the electricity output from the MMC at the fixed low frequency. The arrangement in some embodiments includes a step-up transformer connected between the generator and the MMC, in which implementations the input electricity to the MMC comes from the step-up transformer rather than directly from the output of the generator. Further, the MMC of one or more embodiments includes an input bridge having cascaded power electronic switching circuits and an output bridge having series power-electronic switches. The input and output bridges are connected in a back-to-back configuration via a shared DC link that exhibits a time-varying DC voltage.

In another example, a method for obtaining electricity in an offshore wind turbine farm includes changing a variable first rotational speed of a wind turbine into a higher variable second rotational speed via a gearbox, and generating electricity at a variable first frequency, based on driving a generator having a rated electrical frequency for full-power output in a range from about 50 Hz to about 150 Hz via an output of the gearbox. The method further includes converting, via an MMC, the electricity from the generator into electricity having a fixed low frequency, for offshore collection at the fixed low frequency that is lower than a utility grid frequency.

In another example embodiment, an arrangement includes a MMC that includes a power module to convert variable-frequency AC electricity into fixed low frequency AC electricity. The power module includes an input bridge that is configured to receive input AC electricity over a variable frequency range from an AC power source. The input bridge comprises a number of MMC arms, with each MMC arm coupled to a DC link and comprising cascaded power electronic switching circuits configured to synthesize positive and negative voltages. The power module further includes an output bridge coupled via the DC link to the input bridge and configured to provide output AC electricity at a fixed low frequency. The output bridge comprises a number of series-connected power electronic switches coupling the DC link to the AC output of the power module.

Correspondingly, a control circuit is configured to control switching of the power electronic switching circuits within the input bridge to create a time-varying DC profile on the DC link corresponding to a rectified version of the output AC electricity, and to control switching of the series-connected power electronic switches within the output bridge to switch at zero or near-zero instances of the time-varying DC profile. In an example configuration involving three electrical phases, the arrangement includes a set of three such power modules, with each power module providing conversion for one electrical phase of a three-phase source operating as said AC power source.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIGS. 8 and 9 are block diagrams of additional examples of three-phase configurations of a hybrid MMC, which are provided with isolated input AC power.

FIG. 10 is a plot of example waveforms for the single-phase hybrid MMC introduced in FIGS. 4 and 5.

FIGS. 12 and 13 are block diagrams of example embodiments of a hybrid MMC having an additional degree of cascading with respect to the LFAC output, and are shown in context with multi-winding generators or transformers on the variable-frequency input side.

DETAILED DESCRIPTION

Figure 1:
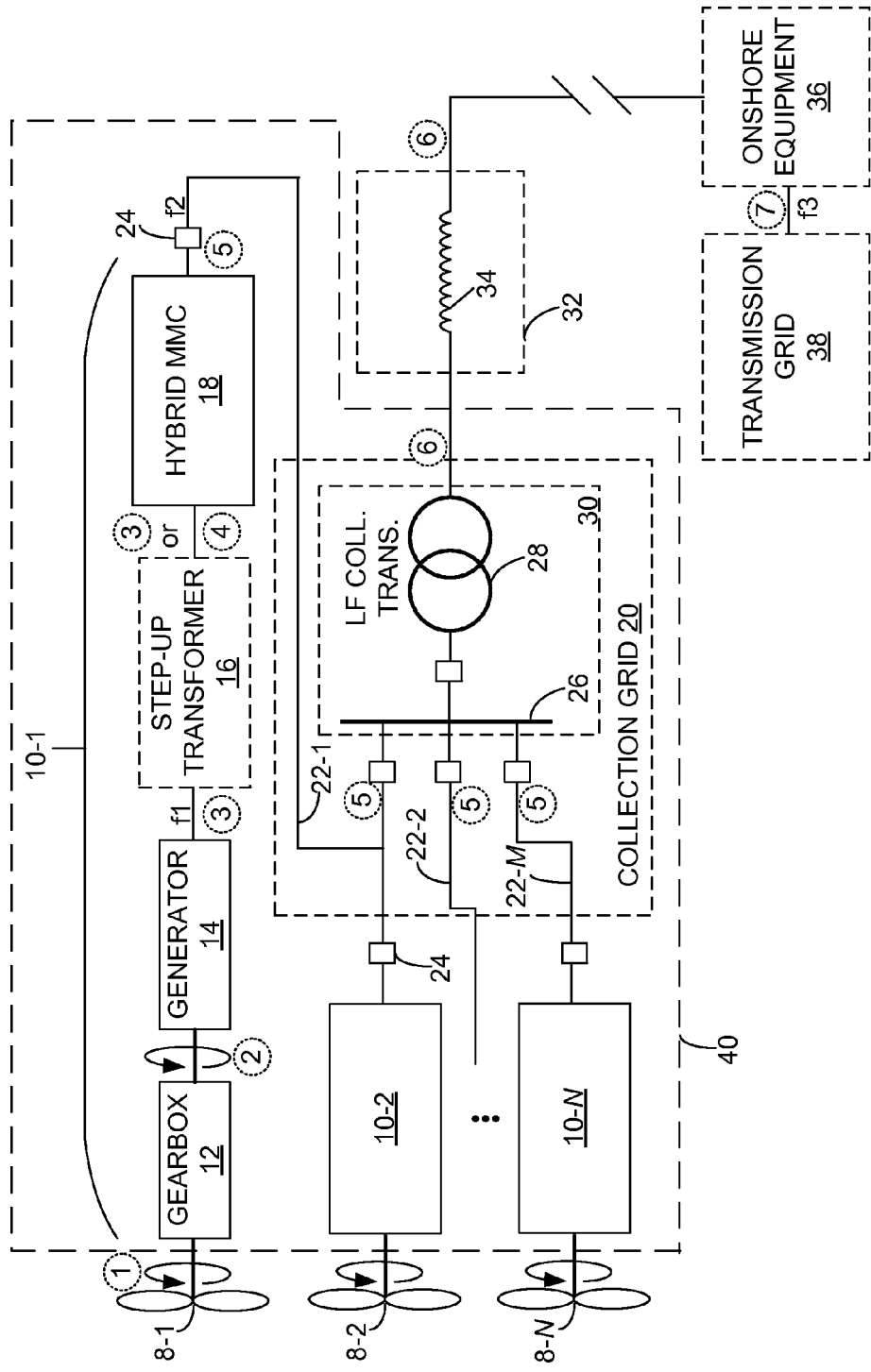
FIG. 1 is a block diagram of one embodiment of a system and arrangement for obtaining electricity from an offshore wind turbine farm.

FIG. 1 illustrates a plurality of like arrangements 10-1, 10-2, . . . , and 10-N, each of which is configured to obtain electricity in an offshore wind farm. More particularly, each arrangement is associated with a given wind turbine 8, and includes a gearbox 12, a generator 14, an optional step-up transformer 16, and an AC-to-AC converter 18. Unless suffixes are needed for clarity, the reference numeral "10" will be used to refer to any given arrangement 10 in the singular sense, and to any given arrangements 10 in the plural sense.

The plurality of arrangements 10 connect to a low-frequency offshore collection grid 20, which includes one or more feeders 22, shown here as feeders 22-1, 22-2, . . . , 22-M. The value of M is an integer number generally less than the value of N—i.e., the number of arrangements 10—inasmuch as each feeder 22 usually will be associated with more than one arrangement 10. Broadly, however, each feeder 22 is coupled to one or more arrangements 10 among the plurality of arrangements 10 and collects the electricity from its associated arrangements 10 into the low-frequency offshore collection grid 20.

The diagram further depicts a number of protective devices 24 disposed at wind turbines 8 for coupling the corresponding arrangements 10 with the low-frequency offshore collection grid 20. Further protective devices 24 are used within a central substation 30 that is included in the low-frequency offshore collection grid 20 for coupling feeders 22 and low-frequency collection transformer 28 with the bus 26. In more detail, one sees that the output from the collection transformer 28, also referred to as a "step-up transformer 28," couples into a low-frequency high-voltage transmission system 32, which includes one or more transmission lines 34 that carry the electricity output from the low-frequency offshore collection grid 20 to onshore equipment 36. In turn, the onshore equipment 36 converts the electricity from the offshore wind into the correct frequency for the coupling into the onshore electric grid 38, with or without further voltage adjustments.

The onshore electric grid 38 comprises, for example, an onshore transmission system operating at 50 Hz or 60 Hz. In some embodiments, the low-frequency offshore collection grid 20 is configured to operate at one-third of the frequency of the onshore electric grid 38, e.g., at about 16 Hz for a 50 Hz utility grid frequency and at about 20 Hz for a 60 Hz utility grid frequency.

With these example details in mind, then, the diagram of FIG. 1 can be understood as disclosing a system 40 that is configured for obtaining electricity in an offshore wind turbine farm. In a minimal configuration, the system 40 includes at least a first one of the previously described arrangements 10. In some embodiments, that first arrangement 10 includes gearbox 12 that is configured to mechanically change a variable first rotational speed of a wind turbine 8 into a higher variable second rotational speed. As a non-limiting example, the gearbox provides an input-to-output turns ratio of from about 10-to-1 to 100-to-1.

The first arrangement 10 further includes a generator 14 having a rated electrical frequency for full-power output in a range from about 50 Hz to about 150 Hz. For example, the generator 14 has a rated electrical frequency of 75 Hz, for full-power output. It is desired herein to generate electricity at frequencies substantially higher than the rotational speed of the wind turbine 8. These higher frequencies are obtained by mechanical gearing in the gearbox 12 and/or by configuring the number of electrical poles in the generator 14. However, the actual frequency of the electricity output from the generator 14 at any given instant will be proportional to the rotational speed of the wind turbine 8 and will vary with the rotational speed of the wind turbine 8.

The electricity output from the generator 14 is referred to herein as having a variable first frequency, denoted as f1 in the diagram. In a non-limiting example of actual operation, the first variable frequency may range from about 20 Hz to about 150 Hz, in dependence on actual wind speed. In more detail, the variable first frequency of the generated electricity may deviate or vary from the rated electrical frequency of the generator with variation of wind speed. For example, a generator 14 having a rated electrical frequency of 50 Hz for full-power output may generate electricity at a corresponding variable frequency in a range between about 20 Hz and about 50 Hz, according to changes in wind speed. At lower wind speeds, the generator may operate near 20 Hz, while at higher wind speeds it may operate near 50 Hz.

The example first arrangement 10 further includes an AC-to-AC converter 18 that is implemented as a hybrid modular multi-level converter or MMC. The AC-to-AC converter 18 is configured to convert the electricity from the generator 14 into electricity that is output from the AC-to-AC converter 18 at a fixed low frequency, denoted as f2 in the diagram, for offshore collection at the fixed low frequency. The fixed low frequency is lower than the targeted utility grid frequency. In some situations it may be beneficial to choose this fixed low frequency to be a value of about one-third of the utility grid frequency, which is denoted as f3 in the diagram. Note that the AC-to-AC converter 18 operates on the electricity output from the generator 14 directly in cases where the step-up transformer 16 is omitted, and indirectly in cases where the step-up transformer 16 is included.

In that latter case, the first arrangement 10 further includes the step-up transformer 16 disposed or connected between the generator 14 and the AC-to-AC converter 18. The step-up transformer 16 has a rated frequency that matches or corresponds to the rated electrical frequency of the generator 14 in the first arrangement. That is, the rated frequency of the step-up transformer 16 complements the rated frequency of the generator 14 and the generally higher electrical frequencies obtained with the disclosed configuration of the arrangement 10 advantageously results in the step-up transformer 16 having a lighter and more compact build than would be practical if the step-up transformer 16 were rated, for example, for operation at or below 20 Hz.

The step-up transformer 16 is configured to step up a voltage of the electricity output from the generator 14, and thereby output electricity at a stepped-up voltage. Correspondingly, the AC-to-AC converter 18 is configured to convert the electricity output at the stepped-up voltage from the step-up transformer 16. That is, the AC-to-AC converter 18 operates on the electricity at the stepped-up voltage. However, this electricity is still considered as being from the generator 14, inasmuch as it is directly obtained by stepping up the output voltage of the generator 14.

In one example of such an embodiment, the generator 14 is configured to output electricity in a voltage range of about 690 V to about 13 KV and the step-up transformer 16 is configured to output electricity in a voltage range of about 13 KV to about 72 KV. In the same or other embodiments, the AC-to-AC converter 18 is configured to output electricity at a fixed low frequency in the range of about 16 Hz to about 20 Hz. See the circled number annotations in FIG. 1 for reference.

Referring to these circled annotation numbers as "Item" numbers, Item 1 denotes the variable first rotational speed of the wind turbine 8. Item 2 denotes the higher variable second rotational speed of the output from the gearbox 12, as mechanically derived from the wind turbine 8. Item 3 denotes the electricity output from the generator 14, which has a first voltage and the variable first frequency.

Continuing with the Item references, Item 4 denotes the electricity output from the step-up transformer 16, having a stepped-up voltage relative to the generator voltage. This stepped-up voltage may be referred to as a second voltage level, which is higher than the first voltage level provided by the generator 14. Because the step-up transformer 16 is included in some embodiments and not in others, the input to the AC-to-AC converter 18 is marked with Item 3 or Item 4, indicating that the AC-to-AC converter 18 may receive electricity at the first or second voltage level. In either case, the AC-to-AC converter 18 outputs electricity having a fixed low frequency, which is denoted as Item 5. It will be understood that the electricity at the output of the AC-to-AC converter 18 may be at the generator voltage, in embodiments that omit the step-up transformer 16, or at the stepped-up voltage of the step-up transformer 16, in embodiments that include the step-up transformer 16.

One further sees that the feeders 22 operate at whatever voltage is output from the AC-to-AC converters 18 that are coupled to each respective feeder 22. Thus, the Item 5 designation is propagated into the low-frequency offshore collection grid 20 and is carried across the bus or buses 26 within the offshore collection grid 20, for input to the substation step-up transformer 28. Correspondingly, the step-up transformer 28 steps up the collection grid voltage to a higher voltage, which may be referred to as a third voltage level or a transmission voltage, denoted by Item 6. This latter designation indicates that the voltage output from the step-up transformer 28 is the voltage used for the low-frequency high-voltage transmission system 32.

While it is contemplated to have a system 40 that includes only a first arrangement 10 as set forth above, other embodiments of the system 40 include a plurality of like arrangements 10, including the first arrangement 10. Each arrangement 10 is associated with a corresponding one of the wind turbines 8 in an offshore wind farm and each includes a gearbox 12, generator 14, and AC-to-AC converter 18. The "overall" system 40 in such embodiments further comprises one or more feeders 22 comprising an offshore low-frequency collection grid 20. Each such feeder 22 is configured to collect the electricity output from the AC-to-AC converter 18 of each arrangement 10. That is, each feeder 22 is associated with one or more of the arrangements 10 and is configured to "collect" the electricity output from the associated arrangements 10 at the fixed low frequency.

The offshore low-frequency collection grid 20 includes a substation 30 having a common step-up transformer 28 that is configured to step up the electricity collected by one or more of the feeders 22. Further, as previously noted, the offshore low-frequency collection grid 20 is configured to output electricity at a stepped-up voltage for transmission to an onshore electric grid 38 via a low-frequency high-voltage transmission system 32. In some embodiments, each feeder 22 is configured for parallel collection of the electricity output by those arrangements 10 among the plurality of arrangements 10 that are coupled to the feeder.

Figure 2:
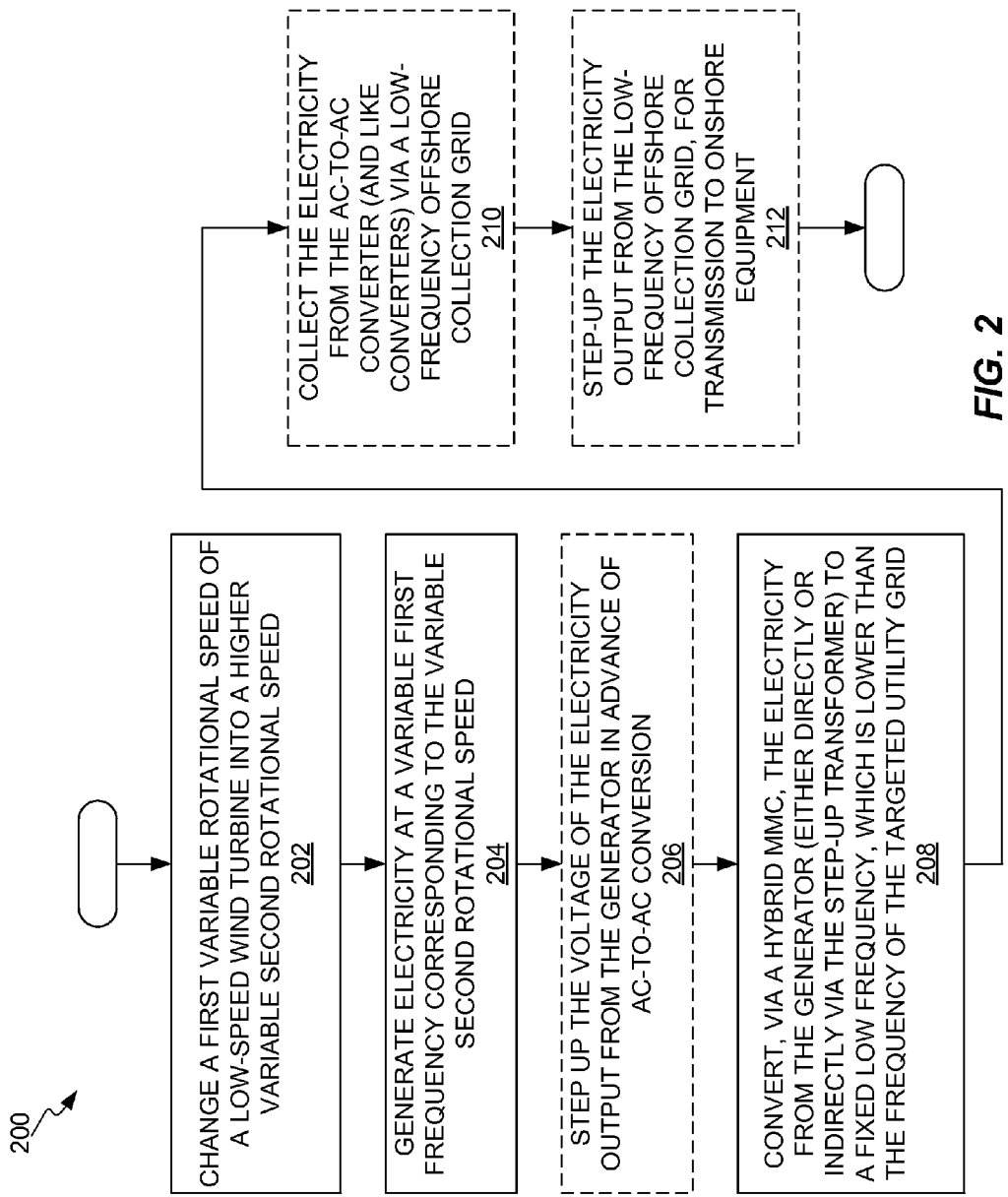
FIG. 2 is a logic flow diagram of one embodiment of a method of obtaining electricity from an offshore wind turbine.

FIG. 2 illustrates a related method 200 of obtaining electricity from an offshore wind turbine farm. The method 200 includes mechanically changing (Block 202) a variable first rotational speed of a wind turbine 8 into a corresponding higher variable second rotational speed, and generating (Block 204) electricity at a variable first frequency, based on driving a generator 14 at the variable second rotational speed. The generator 14 has a rated electrical frequency for full-power output in a range from about 50 Hz to about 150 Hz. Thus, while the nominal frequency of the electricity output from the generator 14 may be taken as its rated frequency, the actual electricity will have a variable first frequency that is a function of the wind speed.

The method 200 further includes converting (Block 208) electricity output from the generator 14 into electricity at a fixed low frequency for offshore collection at the fixed low frequency. The fixed low frequency is lower than the grid frequency of the onshore electric grid 38 and it will be understood that the aforementioned AC-to-AC converter 18 performs the contemplated conversion.

Some embodiments include the further step or operation of stepping up (Block 206) the voltage of the electricity output from the generator 14, in advance of the conversion operation in Block 208. For example, each arrangement 10 includes a step-up transformer 16 connected between the generator 14 and the AC-to-AC converter 18 in the same arrangement 10. When included, the step-up transformer 16 has a rated electrical frequency that matches or otherwise corresponds to the rated electrical frequency of the generator 14.

The method 200 in some embodiments includes the further steps or operation of collecting (Block 210) the electricity output from the AC-to-AC converter used in Block 208 to obtain the electricity at the fixed low frequency, along with the electricity produced from any like converters 18 associated with other wind turbines 8 in the offshore wind farm, via a low-frequency offshore collection grid 20, and stepping up (Block 212) the voltage of the electricity output from the low-frequency offshore collection grid 20, for transmission to onshore equipment 36 via a low-frequency high-voltage transmission system 32. The onshore equipment 36 provides whatever frequency and/or voltage adjustments are required with respect to the onshore electric grid 38.

Referring back to FIG. 1 momentarily, the wind turbines 8 may be grouped and connected to different feeders 22 of the low-frequency offshore collection grid 20. In embodiments where each arrangement 10 includes a step-up transformer 16 between the generator 14 and the AC-to-AC converter 18, the output of the wind turbine 8 associated with each such arrangement 10 is made to "match" the desired voltage and frequency of the collection grid 20. In other words, the variable frequency and variable voltage output of each generator 14, which operates under varying wind speeds, is transformed to the rated frequency and rated voltage of the low-frequency offshore collection grid 20—e.g., a rated frequency of 20 Hz and a rated voltage of 33 KV. Advantageously, then, the arrangements 10 allow multiple wind turbines 8 to be connected in parallel to a given feeder 22. A feeder 22 operated at, say 33 KV, may transfer 30-50 MW of electric power economically.

In a contemplated example, as many as ten wind turbines 8 are associated with a given feeder 22, each having a rated capacity of 5 MW, with additional feeders 22 obtaining electricity from further pluralities of wind turbines 8. The electricity is "collected" in parallel on each such feeder 22 and aggregated at the substation 30. In an example configuration, the generators 14 in a plurality of arrangements 10 are each configured to output electricity in a voltage range of, say, 6.6 KV to 13.8 KV. Of course, higher output voltages may be configured, too. At such voltages, it is economical to couple the output of each generator 14 to the AC-to-AC converter 18 in the same arrangement 10, without use of the intervening step-up transformer 16.

Figure 3:
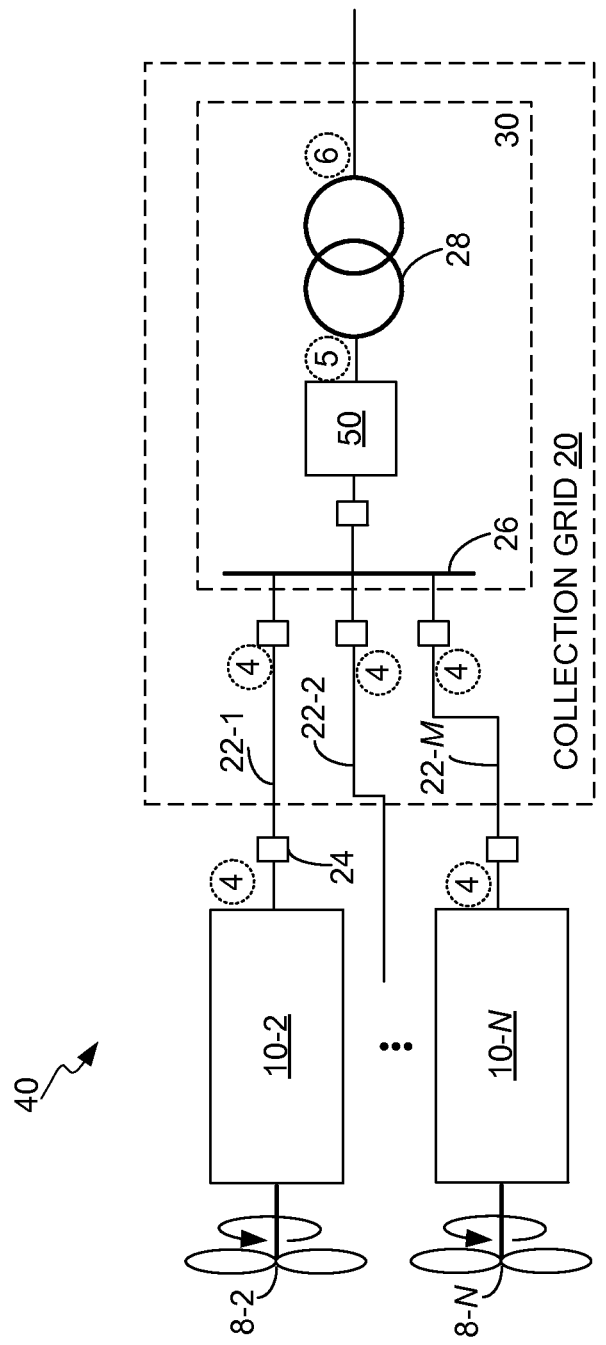
FIG. 3 is a block diagram of another embodiment of arrangements for obtaining electricity from respective offshore wind turbines and a corresponding embodiment for an offshore low-frequency collection grid.

FIG. 3 illustrates another variant of a cluster architecture used for collecting the fixed low frequency electricity output from each arrangement 10. Here, the individual arrangements 10 omit the AC-to-AC converter 18. Instead, AC-to-AC conversion to the fixed low frequency is handled by one or more AC-to-AC converters 50 that are centrally located, preferably on the same platform used to support the substation 30. Note that in this cluster-based architecture, the protective device 24 corresponding to a faulty wind turbine 8 or to a faulty arrangement 10 may be used to disconnect from the affected arrangement 10.

Figures 4, 5:
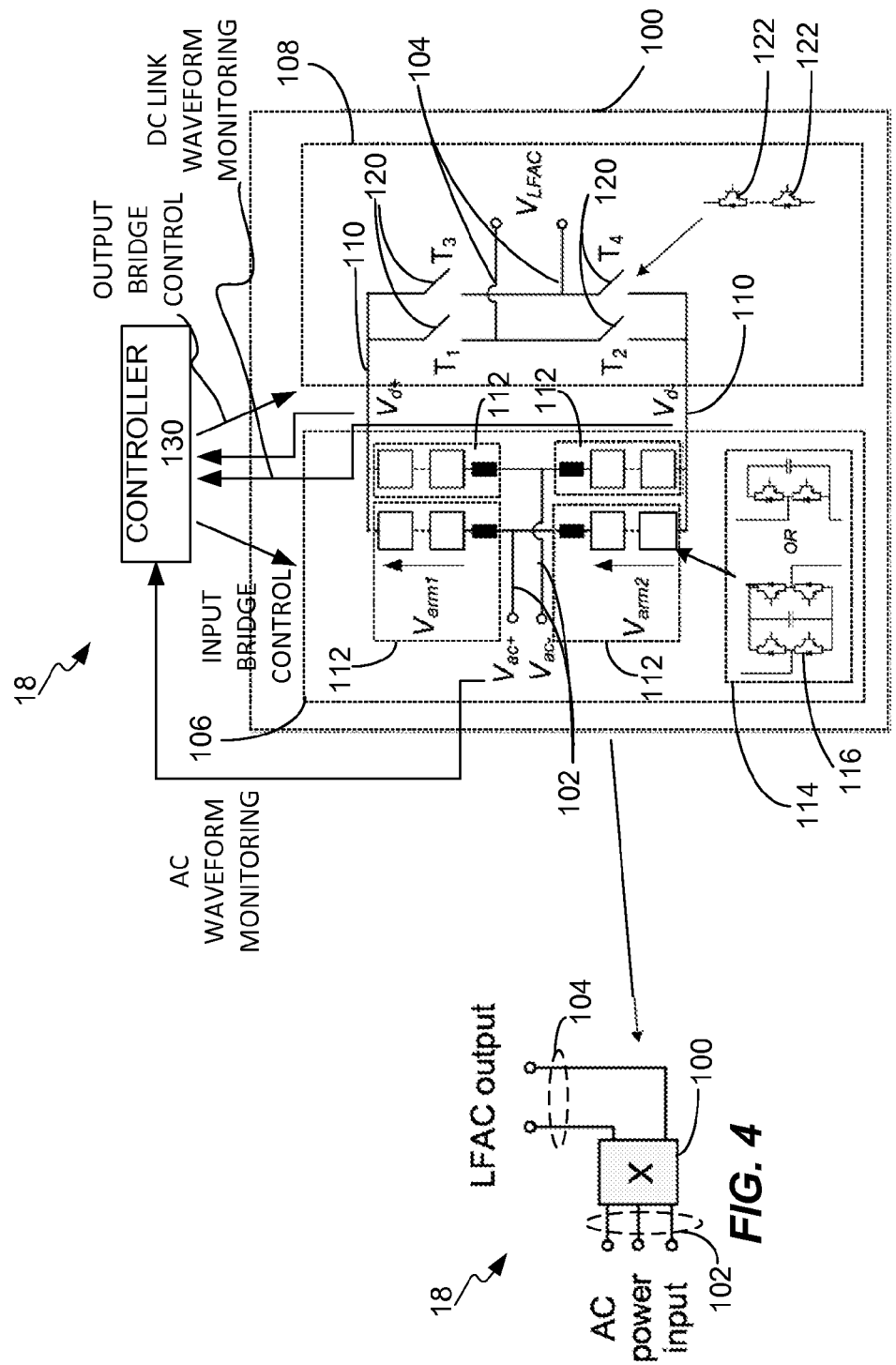
FIGS. 4 and 5 are block diagrams of an example single-phase embodiment of a hybrid Modular Multilevel Converter (MMC) as taught herein.

FIGS. 4 and 5 are block diagrams of an example single-phase embodiments of AC-to-AC converter 18, implemented as a hybrid MMC as taught herein. In particular, FIG. 4 illustrates a "power module" denoted by "X" and the reference number "100" in the diagram. The power module 100 is configured to convert variable-frequency AC electricity as input to it via AC inputs 102 into fixed low frequency AC electricity as output from it via AC outputs 104.

Turning to the details of FIG. 5, the power module 100 includes an input bridge 106, an output bridge 108 and a DC link 110 connecting the input bridge 106 to the output bridge 108. The input bridge 106 is configured to receive input AC electricity over a variable frequency range from an AC power source. While the power source is not explicitly shown in FIGS. 4 and 5, in the context of the aforementioned apparatus 10, the generator 14 operates as the source of input AC electricity. Of course, that input electricity may be stepped up in voltage by a step-up transformer 16 before being applied to the AC inputs 102 of the AC-to-AC converter 18.

The input bridge 106 comprises a number of MMC arms 112, with each MMC arm 112 being coupled to a side of the DC link 110—i.e., the MMC arms 112 that couple to the Vd+ side of the DC link 110 in FIG. 5 may be viewed as "upper" arms, while the MMC arms 112 that couple to the Vd− side of the DC link 110 may be viewed as "lower" arms. Each MMC arm 112 comprises cascaded power electronic switching circuits configured to synthesize positive and negative voltages. These cascaded power electronic switching circuits may be sub-grouped into stacked cells 114 as seen in the non-limiting example of FIG. 5, where each cell includes a switching circuit arrangement 116.

Each cell 114 may comprise, for example, a full-bridge switching circuit, or a half-bridge switching circuit. More generally, the switching circuits in the cells 114 are not limited to full-bridge or half-bridge configurations. For example, the cells 114 may comprise a mix of full-bridge, half-bridge, and other types of switching topologies. The only requirement for the MMC arms 112 and their included cells 114 is being able to synthesize positive and negative voltages.

The output bridge 108, which is coupled via the DC link 110 to the input bridge 106, is configured to provide output AC electricity from the AC output 104 at a fixed low frequency. As seen in the illustrated example, the output bridge 108 comprises a number of series-connected power electronic switches coupling the DC link to the AC output 104 of the power module 100. In this example, there are a number of power electronic switches 120 within the output bridge 108, and each such switch 120 may itself comprise a stacked or cascaded arrangement of power electronic devices 122, for lowering effective voltage seen across each such device.

For ease of functional explanation, one sees two power electronic switches 120 in the output bridge 108 that are labeled as "T1" and "T3" and two power electronic switches 120 in the output bridge 108 that are labeled as "T2" and "T4". The switch T1 forms one switched leg or branch that selectively connects the Vd+ side of the DC link 110 to a first terminal of the AC output 104, while the switch T3 forms a parallel leg or branch from the Vd+ side of the DC link 110 to the other, second terminal of the AC output 104. Again, this illustration is for a single-phase implementation, so the AC output 104 may be regarded as providing line and neutral output terminals. In complementary fashion, the switch T2 selectively connects the Vd− side of the DC link 110 to the first terminal of the AC output 104, and the switch T4 selectively connects the Vd− side of the DC link 110 to the second terminal of the AC output 104.

The AC-to-AC converter 18 further includes a control circuit 130 that is configured to control switching of the power electronic switching circuits 114/116 within the input bridge 106 to create a time-varying DC profile on the DC link 110 that corresponds to a rectified version of the output AC electricity. The control circuit 130 is further configured to control switching of the series-connected power electronic switches 120 within the output bridge 108 to switch at zero or near-zero instances of the time-varying DC profile.

With the above example details in mind, it may be appreciated that the AC-to-AC converter 18 advantageously combines aspects of both cascaded H-bridge (CHB) converters and conventional modular multilevel converters in a new hybrid modular multilevel AC-AC converter configuration. Compared to CHB converters, the AC-to-AC converter 18 requires fewer isolated power inputs. Compared to conventional MMCs, the AC-to-AC converter 18 can require less converter cell capacitance for interfacing with LFAC.

As noted, the upper and lower MMC arms 112 of the input bridge 106 in each power module 100 can synthesize both positive and negative voltage (e.g., $V_{arm1}$ could be >0 at one time and <0 at another time). Examples include an MMC arm 112 comprising full-bridge cells 114, or an MMC arm 112 comprising a mix of full-bridge or half-bridge cells 114. Correspondingly, as also noted, the output bridge 108 consists of series-connected power electronics devices that can be actively turned on or off.

Because the MMC arms 112 are capable of outputting negative voltage, the voltage on the DC link 110 can be periodically reduced to zero or close to zero. As such, the output bridge 108 may switch at close-to-zero voltages, significantly reducing the voltage stress on the series-connect power electronic switches 120 used to form the output bridge 108. Further, as a consequence of the structure adopted for the input bridge 106, the power electronic switches used to form the cells 114 also switch at low voltages under control of the controller 130. Such operation allows the disclosed AC-to-AC converter to scale up in operating voltage.

Figures 6, 7:
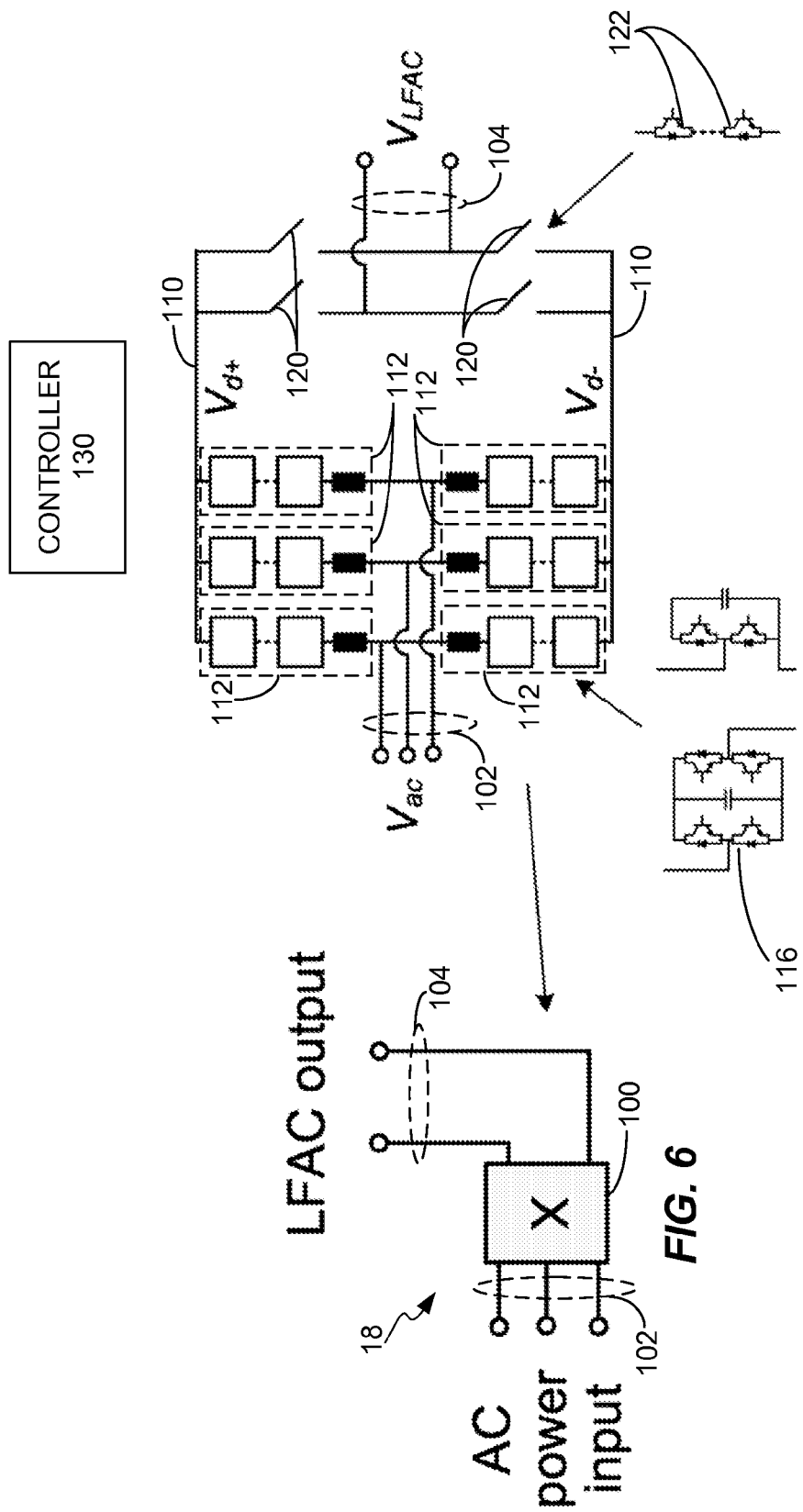
FIGS. 6 and 7 are block diagrams of an example three-phase embodiment of a hybrid Modular Multilevel Converter (MMC) as taught herein.

FIG. 6 illustrates another embodiment of the AC-to-AC converter 18, which embodiment includes a power module 100 configured to receive three electrical phases on its AC input 102. FIG. 7 illustrates corresponding implementation details for the input bridge 106, which includes three upper arms 112, each connecting one input phase to the Vd+ side of the DC link 110, and which further includes three lower arms 112, each connecting one input phase to the Vd− side of the DC link 110.

FIGS. 8 and 9 illustrate further multi-phase implementations of the AC-to-AC converter 18. In particular, in both FIGS. 8 and 9, one sees a power module 100 for each of three electrical phases, where for convenience the modules 100 are distinguished using alphabetic suffixes, e.g., module 100-A, module 100-B and module 100-C. Thus, it will be appreciated that in at least some embodiments, a hybrid MMC implementation of the AC-to-AC converter 18 includes a set of three power modules 100, with each power module 100 providing conversion for one electrical phase of a three-phase source operating as said AC power source. In such configurations, the AC input 102 comprises a multi-phase input, e.g., input 102-A, 102-B and 102-C, and the input bridge 106 includes a corresponding pair of MMC arms 112 that couple a respective phase of the multi-phase input to the Vd+ and Vd− sides of the DC link 110.

FIG. 10 is a plot of example waveforms associated with operation of the hybrid MMC implementation of the AC-to-AC converter 18 proposed herein. This non-limiting example can best be understood with reference to FIGS. 4 and 5, involving a single-phase embodiment of the AC-to-AC converter 18 and its included power module 100.

From the external system conditions, one can derive the desired AC voltage waveforms at both of the input terminals of the AC input 102, which are denoted as $V_{ac}$ and likewise at the output terminals of the AC output 104, which are denoted as $V_{LFAC}$ to indicate the fixed, low-frequency characteristic of the AC electricity output from the AC-to-AC converter 18.

The desired DC link voltage waveform is the rectified LFAC terminal voltage waveform, i.e., $V_{dc}=|V_{LFAC}|$. Thus, the DC link voltage and current are time varying with a dominant AC component being twice the LFAC frequency. In the plot of FIG. 10, the midpoint voltage of the DC link is used as a reference voltage, i.e., $V_{dc}=V_{d+}-V_{d-}$ and $|V_{d+}|=|V_{d-}|$.

From the desired AC voltages at the input terminals (e.g., terminal $V_{ac+}$) and the desired DC link voltages, the desired MMC upper arm voltages can be obtained as the difference between the positive DC voltage and the respective AC input terminal voltage, (e.g., $V_{arm1}=V_{d+}-V_{ac+}$). Similarly, the desired MMC lower arm voltages can be obtained as the difference between the respective AC input terminal voltage and the negative DC voltage (e.g., $V_{arm2}=V_{ac+}-V_{d-}$). The control circuit 130 controls the timing and coordination of switching for the cascaded cells 114 in the MMC arms 112 of the input bridge 106 to synthesize the desired arm voltages.

Figure 11:
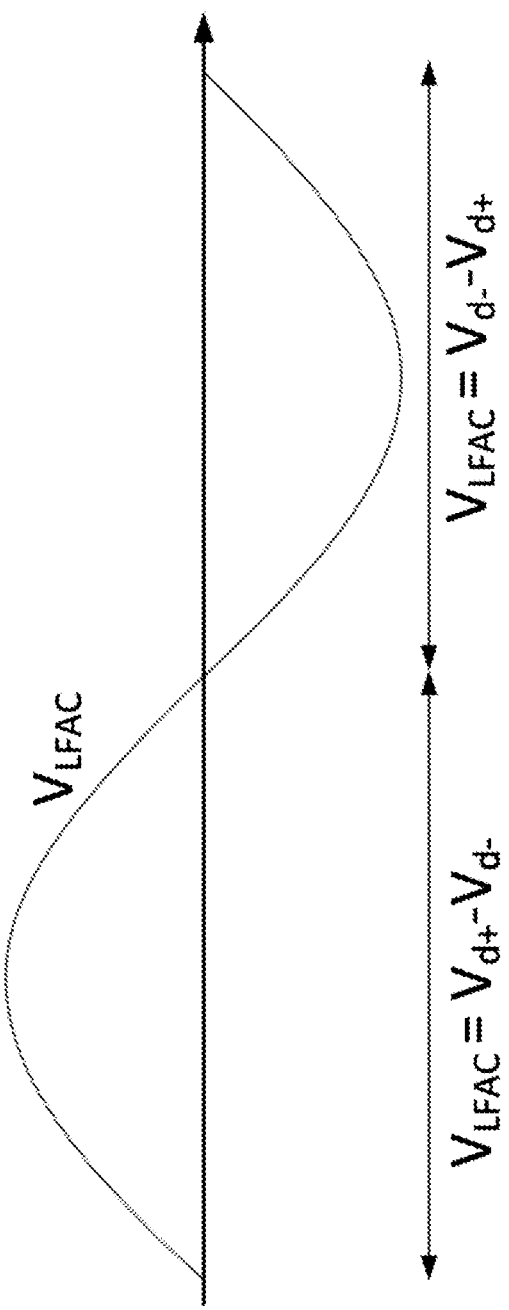
FIG. 11 is a plot of an example LFAC output waveform, as derived via a hybrid MMC from the DC link waveform(s) depicted in FIG. 10.

As a further advantage, the control circuit 130 controls the power electronic switches 120 in the output bridge 108 to switch at or close to zero DC voltage. For example, when T1 and T4 are ON (and T2 and T3 are OFF) during the positive half cycle, the AC-to-AC converter 18 outputs the time-varying DC voltage seen on the DC link 110. When T2 and T3 are ON (and T1 and T4 are OFF) during the negative half cycle, the AC-to-AC converter 18 outputs the reverse of the time varying DC voltage seen on the DC link 110. The resultant single-phase AC waveform output from the AC output 104 is seen in FIG. 11.

When configuring the disclosed AC-to-AC converter 18 for a three-phase output, the AC power input to each power module 100 needs to be isolated. This arrangement was suggested in FIGS. 8 and 9 and more detailed examples are seen in FIGS. 12 and 13, which illustrate the use of isolated generator windings or isolated transformer windings to obtain isolated input power.

Further, FIGS. 12 and 13 demonstrate that an additional degree of cascading may be used with respect to the AC output 104. In particular, one sees that the aforementioned power modules 100 may themselves be cascaded in the input bridge 106 with respect to the DC link 110 and that the AC input 102 may be driven with a variable-frequency AC signal from a multi-winding generator or transformer 150. In this sense, the generator or transformer 150 will be understood in an example case as being the generator 14 shown in FIG. 1 for a given apparatus 10, or a step-up transformer 16 for embodiments that step up the generator voltage for input to the AC-to-AC converter 18.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A system configured for obtaining electricity in an offshore wind turbine farm and including a first arrangement that comprises:
   a gearbox configured to mechanically change a variable first rotational speed of a wind turbine into a higher variable second rotational speed;
   a generator having a rated electrical frequency for full-power output in a range from about 50 Hz to about 150

Hz, and configured to be driven at the variable second rotational speed by an output of the gearbox and to thereby generate electricity at a correspondingly variable first frequency; and an AC-to-AC converter configured to convert the electricity from the generator into electricity output from the AC-to-AC converter at a fixed low frequency for offshore collection at the fixed low frequency, wherein the fixed low frequency is lower than a utility grid frequency;

said AC-to-AC converter comprising a modular multilevel converter (MMC) having converter inputs, corresponding converter outputs, and associated modular conversion circuitry, which collectively are configured to receive input electricity over a variable frequency range expected for the variable first frequency of the electricity output from the generator and to convert the input electricity into the electricity output from the MMC at the fixed low frequency.

2. The system of claim 1, wherein the first arrangement further comprises a step-up transformer having a rated electrical frequency corresponding to the rated electrical frequency of the generator, wherein the step-up transformer is connected between the generator and the MMC, wherein the step-up transformer is configured to step up a voltage of the electricity output from the generator, and thereby output electricity at a stepped-up voltage, and wherein the MMC is configured to convert the electricity output at the stepped-up voltage from the step-up transformer.

3. The system of claim 2, wherein the generator is configured to output electricity in a voltage range of about 690 V to about 13 KV and wherein the step-up transformer is configured to output electricity in a voltage range of about 13 KV to about 72 KV.

4. The system of claim 1, wherein the MMC is configured to output electricity at a fixed low frequency in a range of about 16 Hz to about 20 Hz.

5. The system of claim 1, further comprising:
a plurality of like arrangements, including the first arrangement; and
one or more feeders comprising an offshore low-frequency collection grid;
wherein each feeder is configured to collect the electricity output from the AC-to-AC converter of each arrangement that is coupled to the feeder.

6. The system of claim 5, wherein the offshore low-frequency collection grid includes a substation having a common step-up transformer that is configured to step up the electricity collected by one or more of the feeders, and to correspondingly output electricity at a stepped-up voltage for transmission to an onshore electric grid via a low-frequency, high-voltage transmission system.

7. The system of claim 1, wherein the MMC of the first arrangement comprises an input bridge having cascaded power electronic switching circuits and an output bridge having series power-electronic switches, said input and output bridges connected in a back-to-back configuration via a shared DC link that exhibits a time-varying DC voltage.

8. The system of claim 7, wherein the MMC is configured to derive the time-varying DC voltage from AC voltage applied to the input bridge and to control the time-varying DC voltage to follow the shape of a rectified version of an AC control signal.

9. The system of claim 8, wherein the MMC includes control circuitry that is configured to synchronize operation of the input and output bridges to effect zero-voltage or near zero-voltage switching of the power-electronic switches in the output bridge, with respect to the time-varying DC voltage of the shared link.

10. The system of claim 7, further comprising a control circuit configured to control switching of the cascaded power electronic switching circuits in the input bridge in dependence on AC voltage or current waveforms of the electricity input to the MMC, and to control switching of the series of power-electronic switches in the output bridge in dependence on the time-varying DC voltage of the shared link.

11. A method for obtaining electricity in an offshore wind turbine farm comprising:
changing a variable first rotational speed of a wind turbine into a higher variable second rotational speed via a gearbox;
generating electricity at a variable first frequency, based on driving a generator having a rated electrical frequency for full-power output in a range from about 50 Hz to about 150 Hz via an output of the gearbox; and
converting, via a modular multilevel converter (MMC), the electricity from the generator into electricity having a fixed low frequency, for off-shore collection at the fixed low frequency, wherein the fixed low frequency is lower than a utility grid frequency and said step of converting including converting the electricity from the generator over a variable frequency range into electricity at the fixed low frequency.

12. The method of claim 11, further comprising increasing the voltage of the electricity output from the generator via a step-up transformer, for input to the MMC.

13. The method of claim 12, wherein increasing the voltage of the electricity output from the generator comprises stepping up the voltage from a range of about 690 V to about 13 KV, to a range of about 13 KV to about 72 KV.

14. The method of claim 11, wherein the fixed low frequency is in a range of about 16 Hz to about 20 Hz.

15. The method of claim 11, further comprising performing said steps of changing, generating and converting for a plurality of wind turbines, and collecting the electricity at the fixed low frequency from each of the respective MMCs associated with the plurality of wind turbines via one or more feeders comprising an offshore low-frequency collection grid.

16. The method of claim 15, further comprising using a common step-up transformer in the offshore low-frequency collection grid to correspondingly output electricity at a stepped-up voltage for transmission to an onshore electric grid via a low-frequency, high-voltage transmission system.

17. The method of claim 11, wherein the MMC of the first arrangement comprises an input bridge having cascaded power electronic switching circuits and an output bridge having series power-electronic switches, said input and output bridges connected in a back-to-back configuration via a shared link that exhibits a time-varying DC voltage, and wherein the method further comprises deriving the time-varying DC voltage from AC voltage applied to the input bridge and controlling the time-varying DC voltage to follow the shape of a rectified version of an AC control signal.

18. The method of claim 17, further comprising synchronizing operation of the input and output bridges to effect zero-voltage or near zero-voltage switching of the power-electronic switches in the output bridge, with respect to the time-varying DC voltage of the shared link.

19. The method of claim 18, wherein deriving the time-varying DC voltage comprises controlling switching of the cascaded power electronic switching circuits in the input bridge in dependence on AC voltage or current waveforms of the electricity input to the MMC, and wherein synchronizing operation of the input and output bridges includes controlling switching of the series of power-electronic switches in the output bridge in dependence on the time-varying DC voltage of the shared link.

20. An arrangement comprising a modular multilevel converter (MMC) that comprises a power module to convert variable-frequency AC electricity into fixed low frequency AC electricity, said power module comprising:

an input bridge configured to receive input AC electricity over a variable frequency range from an AC power source and comprising a number of MMC arms, with each MMC arm coupled to a DC link and comprising cascaded power electronic switching circuits configured to synthesize positive and negative voltages;

an output bridge coupled via the DC link to the input bridge and configured to provide output AC electricity at a fixed low frequency, said output bridge comprising a number of series-connected power electronic switches coupling the DC link to the AC output of the power module; and a control circuit configured to control switching of the power electronic switching circuits within the input bridge to create a time-varying DC profile on the DC link corresponding to a rectified version of the output AC electricity, and to control switching of the series-connected power electronic switches within the output bridge to switch at zero or near-zero instances of the time-varying DC profile.

21. The arrangement of claim 20, comprising a set of three power modules, with each power module providing conversion for one electrical phase of a three-phase source operating as said AC power source.

22. The arrangement of claim 20, wherein the AC input comprises a multi-phase input, and wherein the input bridge includes a corresponding pair of MMC arms that couple a respective phase of the multi-phase input to the DC link.

23. The arrangement of claim 20, wherein the arrangement comprises a generator as said AC power source, wherein the generator is configured for use with a wind turbine, including having a rated electrical frequency for full-power output in a range from about 50 Hz to about 150 Hz, and being configured to be driven at a variable rotational speed by an output of a wind turbine gearbox.

24. The arrangement of claim 23, wherein the arrangement further comprises a step-up transformer disposed between an output of the generator and the AC input of the MMC and configured to step-up the voltage of the AC electricity output from the generator before being input to the MMC as said input AC electricity.

\* \* \* \* \*